United States Patent [19]

Bowen et al.

[11] 4,435,850

[45] Mar. 6, 1984

[54] SECURE FIBER OPTIC DATA TRANSMISSION SYSTEM

[75] Inventors: James H. Bowen, Williamsburg; David L. Baldwin; Philip R. Couch, both of Roanoke, all of Va.

[73] Assignee: International Telephone and Telegraph Corporation, New York, N.Y.

[21] Appl. No.: 349,147

[22] Filed: Feb. 16, 1982

[51] Int. Cl.³ ............................................... H04B 9/00
[52] U.S. Cl. .................................. 455/606; 455/612; 340/555; 356/73.1
[58] Field of Search ............... 455/612, 600, 606, 607, 455/608, 611; 340/541, 555, 556, 557; 350/96.33; 356/73.1

[56] References Cited
U.S. PATENT DOCUMENTS
4,217,488 8/1980 Hubbard ............................ 455/612

4,292,628 9/1981 Sadler ................................ 340/555

*Primary Examiner*—John C. Martin
*Assistant Examiner*—Edward L. Coles
*Attorney, Agent, or Firm*—John T. O'Halloran; Peter R. Ruzek

[57] ABSTRACT

A fiber optic data transmission system is protected against external physical intrusion by obscuring the data in the natural quantum noise and then limiting access to the intruder by means of an optical power alarm. This is accomplished by modulating the data on a very large predetermined average optical power with a very small modulation index and then providing an alarm arrangement which is responsive to the received optical energy to activate an alarm means and to deactivate its associated transmitting arrangement when the received optical energy has an amplitude outside of a given amplitude region.

14 Claims, 3 Drawing Figures

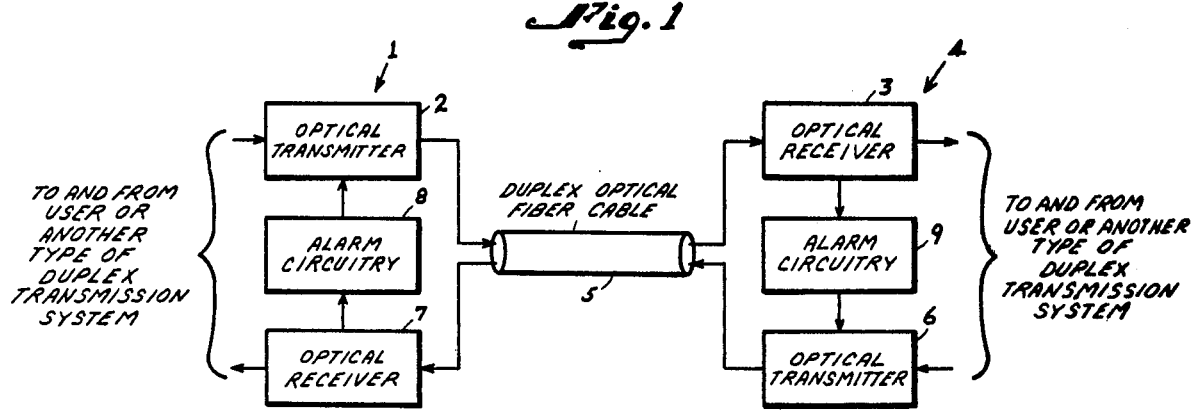
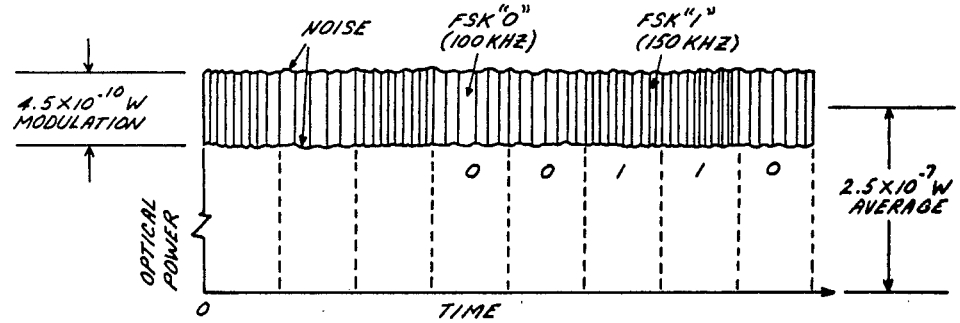
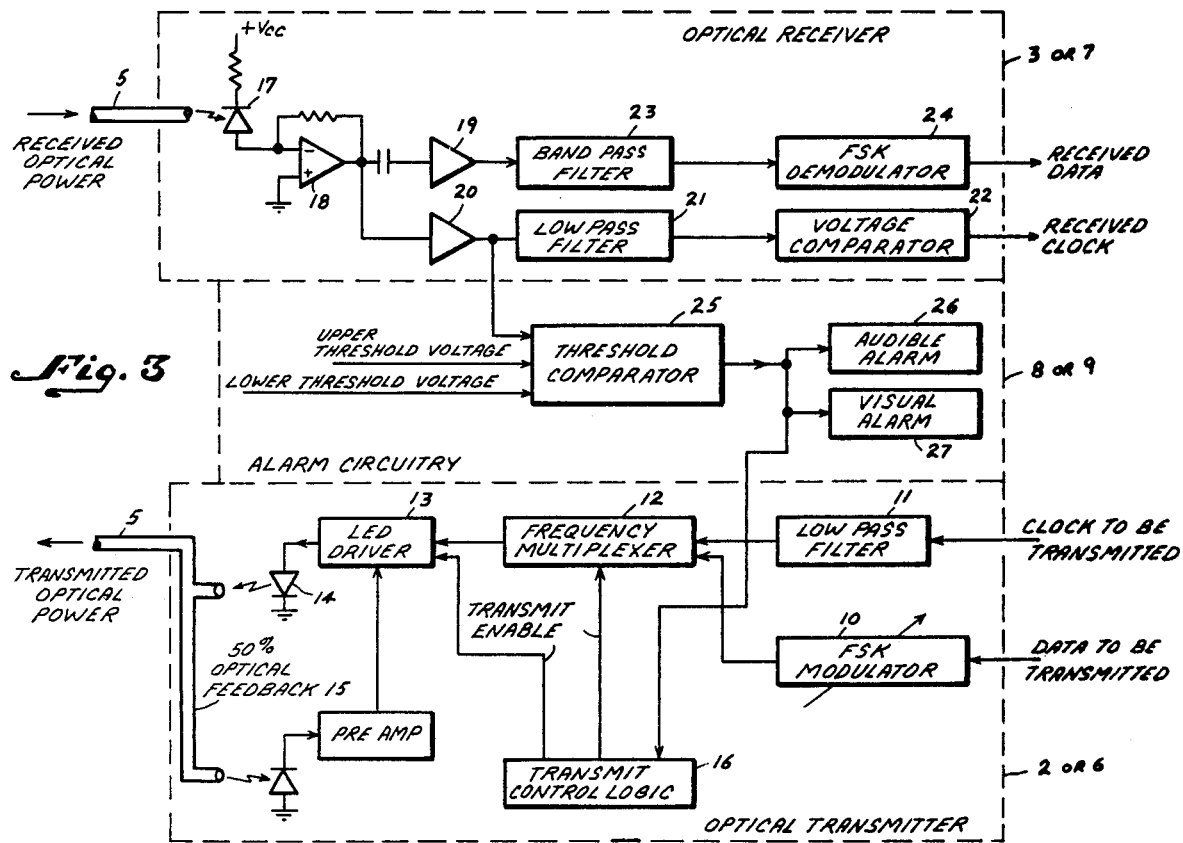

SECURE FIBER OPTIC DATA TRANSMISSION SYSTEM

BACKGROUND OF THE INVENTION

The present invention relates to fiber optic data transmission systems and more particularly to a secure fiber optic data transmission system.

The present invention is an arrangement to provide protection against external physical tampering with an optical fiber carrying data modulated on the light beam propagated in the optical fiber. The arrangement prevents tapping or otherwise obtaining classified or otherwise sensitive data propagating in the fiber. In the past, other techniques have been developed for securing transmission in an optical fiber such as the use of special concentric core fibers or the use of special couplers for modal multiplexing of various signals on a signal optical fiber. More conventional techniques for providing physical security of data transmission includes encryption or physical protection in one of many forms such as:

(a) Physical hardening, such as, reinforced concrete ducts or ferrous metal welded pipes;
(b) Physical hazards, such as, toxic gases, high voltage, explosives, or trained dogs; and
(c) Monitors and alarms, such as, pressurized conduits, electrical capacitance variation, TV cameras, and guard surveillance.

All of the above mentioned devices share the shortcomings of high costs and high complexities. In addition, they are often rather inconvenient and/or unattractive.

SUMMARY OF THE INVENTION

An object of the present invention is to provide a secure fiber optic data transmission system overcoming the above mentioned disadvantages of the prior art protection arrangements.

Another object of the present invention is to provide a secure fiber optic data transmission system employing the technique of obscuring the data in the natural quantum noise and then limiting access to an intruder by means of an optical power alarm.

A feature of the present invention is the provision of a secure fiber optic data transmission system comprising: an optical fiber means to provide two way optical communication between two spaced terminals; each of the two terminals including first means coupled to an adjacent end of the optical fiber means to receive optical energy modulated by data transmitted from the other of the two terminals; second means coupled to the adjacent end of the optical fiber means to transmit modulated optical energy to the other of the two terminals, the transmitted optical energy having a very large predetermined average optical power and data modulated thereon with a very small modulation index; and third means coupled to the first and second means responsive to the received optical energy to activate an alarm means and to deactivate the second means when the received optical energy has an amplitude outside of a given amplitude region.

BRIEF DESCRIPTION OF THE DRAWING

Above mentioned and other features and objects of this invention will become more apparent by reference to the folllowing description taken in conjunction with the accompanying drawing, in which:

FIG. 1 is a block diagram of a secure fiber optic data transmission system in accordance with the principles of the present invention;

FIG. 2 is a curve of optical fiber vs. time of one possible data format that can be employed in the system of FIG. 1; and FIG. 3 is a more specific block diagram of one terminal of the transmission system of FIG. 1.

DESCRIPTION OF THE PREFERRED EMBODIMENT

Referring to FIG. 1, there is illustrated therein a simplified block diagram of the secure fiber optic data transmission system in accordance with the principles of the present invention in a full duplex configuration. The system includes a first terminal 1 having an optical transmitter 2 in communication with an optical receiver 3 in terminal 4 through a duplex optical fiber cable 5 and an optical transmitter 6 in terminal 4 in communication with an optical receiver 7 in terminal 1 through the duplex optical fiber cable 5. The system thus far described is the typical and usual optical fiber transmission system which may be connected to a user or to another type of duplex transmission system, such as, line of sight, radio transmission, tropospheric scatter radio transmission, radio satellite transmission system or a wire transmission system.

In accordance with the principles of the present invention, the conventional fiber optic data transmission system is modified to provide alarm circuitry 8 in a terminal 1 and alarm circuitry 9 in a terminal 2 and modifying the optical transmitters 2 and 6 to provide a very high predetermined average optical power to provide natural quantum noise which is used to obscure the data modulated thereon with a very low modulation index.

The alarm circuitry 8 and 9 monitors the average optical power level at the receivers 7 and 3, respectively, and will provide an alarm if there is any deviation above or below a preset threshold or amplitude region. The threshold hold values can be set at plus or minus a fraction of 1% or up to several tens of percent. The light emitting diode or laser transmitter of the optical transmitters 2 and 6 are stabilized to minimize their variation. Thus, any deviation beyond the preset threshold or amplitude region is most likely due to an intruder tampering with the optical fiber.

The predetermined average optical power alarm provides the penetration resistance. The low modulation index adds security by making it more difficult for an intruder to get intelligible data out of the very small amount of optical power that he can tap without setting off the alarm. Nearly any kind of data can be used with the low modulation index. Both analog and digital data formats are possible.

FIG. 2 illustrates one possible data format; namely, frequency shift keying (FSK) with a very small modulation index FSK carrier superimposed upon a very large predetermined average optical power. The large average optical power insures a lot of quantum noise. The modulation index is set just high enough to ensure adequate signal to noise ratio at receivers 3 and 7.

The present invention provides a secure fiber optic data transmission system using quantum noise limited operation achieved with a low modulation index together with using an average optical power alarm. The present invention is not restricted to specific data forms, such as, frequency shift keying or to any specific circuits. Nevertheless, a specific implementation using frequency shift keying modulation and circuits for generating the data format and the alarm are shown in block diagram form in FIG. 3. FIG. 3 provides more detail with regard to the components of the optical transmitter, the optical receiver, and the alarm circuitry shown in either terminal 1 or terminal 4 of FIG. 1.

In FIG. 3, the incoming digital data to be transmitted is coupled to FSK modulator 10 where binary "1" is converted to a first carrier frequency tone and binary "0" is converted to a second frequency tone. The FSK data output of modulator 10 is multiplexed with a baseband clock signal from low pass filter 11 in a frequency multiplexer 12. The multiplexing of the clock with the FSK data is an added feature and not part of the present invention. The output of modulator 10 could just as well be applied directly to the light emitting diode (LED) driver 13 rather than through frequency multiplexer 12. LED driver 13 superimposes the FSK data with a small adjustable modulation index onto a large direct current to obtain the combined AC (alternating current) and DC (direct current) signal used to drive the LED 14. Portion of the output optical power from LED 14 is tapped off and used in an optical feedback circuit 15 to stabilize the average optical power transmitted (the DC portion of the signal used to drive LED 14). The optical transmitter also has a transmit control logic 16 that responds to an alarm output of alarm circuitry 8 or 9 and shuts down the data link by disabling the driver 13 and multiplexer 12 if the alarm circuitry is activated.

Optical receiver 3 or 7 receives the optical power modulated by data by a simple front end including photo detector 17 and amplifiers 18, 19 and 20. The output of amplifier 20 is a DC coupled signal which is coupled to alarm circuitry 8 or 9 which will be discussed herein below. The baseband clock signal is filtered by a low-pass filter 21 whose output is coupled to a voltage compared with 22 to provide the baseband clock signal. The FSK carrier data at the output of amplifier 19 is coupled to band pass filter 23 and then demodulated back to binary "1" and "0" by FSK demodulator 24.

The DC coupled signal at the output of amplifier 20 in receiver 3 or 4 is compared with preset reference or threshold levels to establish upper and lower threshold levels in threshold comparator 25. If the DC signal at the output of amplifier 20 deviates outside the predetermined amplitude range of comparator 25 as set by the predetermined upper and lower threshold voltages then an alarm is activated. The alarm may be an audible alarm 26 or a visual alarm 27 or both. When either or both of the alarms 26 and 27 are activated by the output from comparator 25 this same output is coupled to the transmit control logic 16 of the optical transmitter to deactivate the transmit enable signal and thereby deactivate the driver 13 and multiplexer 12 to shut down transmission. When the predetermined average optical power transmission is terminated, the alarm circuitry of the other terminal is activated and terminates transmission from the transmitter at that terminal. Thus, when an intrusion is detected the alarm circuitry is activated at both ends of the data link annd the transfer of data on the two-way communication system is terminated.

The operation of the alarm is very straight forward. The average optical power, $P_o$, at the receiver is simply detected so that its amplitude is directly proportional to an output voltage. That voltage is compared to reference voltages establishing predetermined thresholds.

The quantum noise limited signal protection is a little more subtle. Its operation is coupled to the alarm circuitry since its degree of protection partially depends on the amount of power available to an intruder before the alarm is activated. The quality of information received is dependent on the signal to noise ratio (snr) were:

$$snr = 20 \log_{10} \xi \qquad (1)$$

$$\xi = \frac{i_S}{[i_Q^2 + i_T^2]^{\frac{1}{2}}} \qquad (2)$$

where $i_S$ is the rms (root means square) signal current and $i_Q$ is the quantum noise fundamentally associated with an optical signal; this noise cannot be eliminated. The $i_T$ term represents all other noise including thermal noise and noise associated with the receiver front end. Then $$i_Q = (2eRP_oB)^{\frac{1}{2}} \qquad (3)$$

$$i_S = \frac{M}{\sqrt{2}} RP_o \qquad (4)$$

$$M = \text{modulation index} \qquad (5)$$

$$R = \text{detector responsivity} \approx 0.5 \, A/W \qquad (6)$$

$$e = \text{electronic charge} = 1.6 \times 10^{-19} \text{ coulombs} \qquad (7)$$

$$B = \text{signal filter bandwidth} \qquad (8)$$

The thermal noise and amplifier noise are fixed independent of the received optical power. Thus, $P_o$ can be picked such that $$i_Q^2 >> i_T^2 \qquad (9)$$

Then from equation 2

$$\xi = (i_S/i_Q) \qquad (10)$$

$$\xi = \frac{\frac{M}{\sqrt{2}} RP_o}{(2eRP_oB)^{\frac{1}{2}}} \qquad (11)$$

$$\xi = \frac{M}{2} \left( \frac{RP_o}{eB} \right)^{\frac{1}{2}} \qquad (12)$$

Thus, it can be seen that as long as the quantum noise swamps the thermal noise and amplifier noise the signal to noise ratio is proportional to the square root of the received optical power. The modulation index can be set to give any desired signal to noise ratio at the receiver. Since an intruder can tap at the most a fraction of the light, the tapped signal to noise ratio is significantly lower. Thus, the quantum noise limited operation provides some security so that only the most sophisticated intruder can get intelligible data.

The secure fiber optic data transmission system of the present invention can be used in numerous applications where sensitive or classified information must be transmitted and yet protected from unauthorized physical access to the transmission system. Some of the applications are as follows:

(a) Computer links
(b) Teletype links
(c) Encrypted teletype links
(d) Digital voice modems
(e) Interbuilding communications including security agencies, government agencies, banks, and private industry.

While we have described above the principles of our invention in connection with specific apparatus it is to be clearly understood that this description is made only by way of example and not as a limitation to the scope of our invention as set forth in the objects thereof and in the accompanying claims.

We claim:

1. A secure fiber optic data transmission system comprising:
an optical fiber means to provide two way optical communication between two spaced terminals;
each of said two terminals including
first means coupled to an adjacent end of said optical fiber means to receive optical energy modulated by data transmitted from the other of said two terminals;
second means coupled to said adjacent end of said optical fiber means to transmit modulated optical energy to said other of said two terminals, said transmitted optical energy having a predetermined average optical power and data modulated thereon with a modulation index; and
third means coupled to said first and second means resonsive to said received optical energy to activate an alarm means and to deactivate said second means when said received optical energy has an amplitude outside of a given amplitude region,
said third means including
a threshold comparator coupled to said first and second means having two spaced threshold values to define said given amplitude region.

2. A system according to claim 1, wherein said data is analog data.

3. A system according to claim 1, wherein said data is binary data.

4. A system according to claim 3, wherein said binary data is represented by two different frequencies according to frequency shift techniques.

5. A system according to claims 1, 2, 3, or 4, wherein said modulation index is just high enough to ensure an adequate signal to noise ratio at said first means to enable recovery of said data from said received data modulated optical energy.

6. A system according to claim 1, wherein said alarm means includes
a visual alarm.

7. A system according to claim 2, wherein said alarm means further includes
a visual alarm.

8. A system according to claim 3, wherein said alarm means includes
a visual alarm.

9. A system according to claim 5, wherein said alarm means includes
an audible alarm.

10. A system according to claim 9, wherein said alarm means further includes
a visual alarm.

11. A system according to claim 5, wherein said alarm means includes
a visual alarm.

12. A system according to claims 1, 2, 3, or 4, wherein said alarm means includes
an audible alarm.

13. A system according to claim 12, wherein said alarm means further includes
a visual alarm.

14. A system according to claim 4, wherein said alarm means includes
a visual alarm.

* * * * *